Inventors
GIOVANNI BUTTIRONI
ANGELO GIAVARINI
By
Attorney

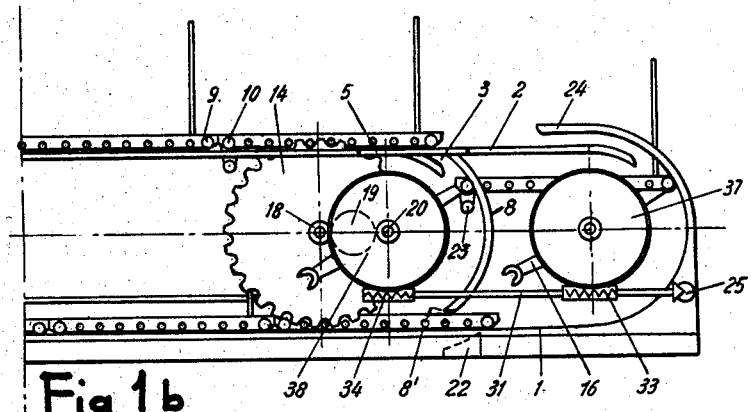
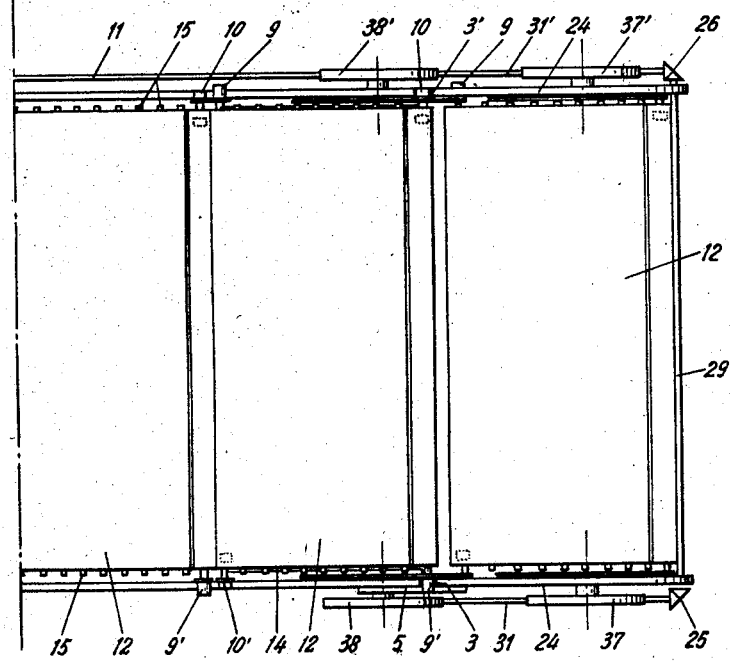

July 7, 1959
G. BUTTIRONI ET AL
2,893,538
REVERSIBLE CONVEYOR SYSTEM
Filed Aug. 19, 1955
3 Sheets-Sheet 3
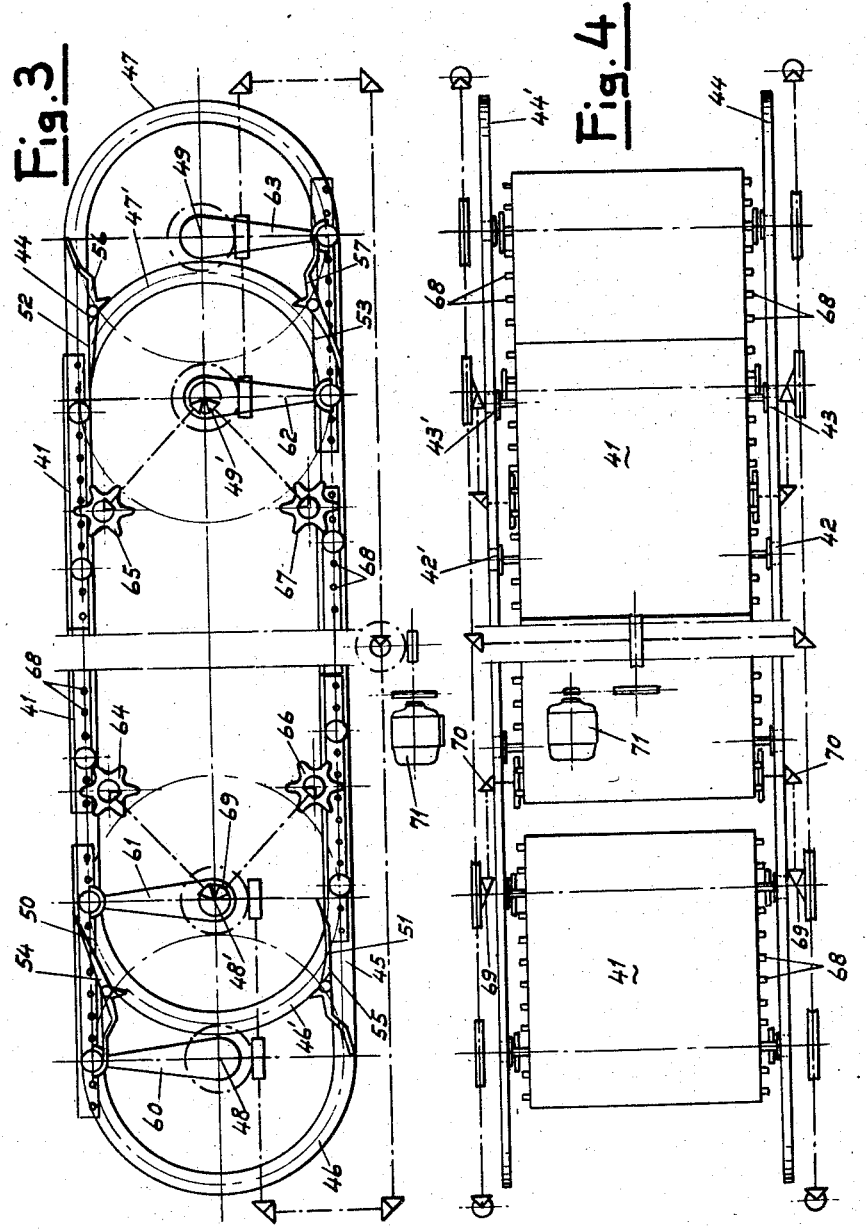
Inventors
GIOVANNI BUTTIRONI
ANGELO GIAVARINI
By
Attorney United States Patent Office 2,893,538
Patented July 7, 1959

2,893,538

REVERSIBLE CONVEYOR SYSTEM

Giovanni Buttironi and Angelo Giavarini, Bergamo, Italy

Application April 19, 1955, Serial No. 502,351

Claims priority, application Germany April 22, 1954

3 Claims. (Cl. 198—110)

This invention relates to a novel and particularly advantageous device for the storing or conveying of goods, in particular of motor vehicles or the like with a plurality of individual platforms circulating by means of two pairs of rolls or studs and having a lateral guide which on one hand may serve as a covering of the device and on the other hand, in case of comparatively great inclination, is necessary in particular with vertically guided rail tracks, in order to prevent the platforms from turning upside down.

Conveyors for motor vehicles heretofore used have been costly, cumbersome, with complicated transfer mechanisms for guiding the vehicles from one level to another and have been subject to shut downs due to the breakage of parts.

A device of this kind can be provided with tracks at any desired angle of inclination in respect to the ground avoiding any danger of tilting of the platforms in the transition zones between the two running directions because the platforms are steadily held in parallelism with the tracks by gripper means.

The device according to the invention may find application with the most varied kinds of transport and storage of any goods, particularly of such goods the horizontal position of which has to be kept up during conveyance or storage. This device may be used e.g. to load ships with transport goods such as vehicles or the like, in railway or mailing plants for the transport of goods or anyway as a conveyor for industrial purposes. The charging and discharging places may be conveniently provided at the two ends of the device in the form of a loading ramp or trap. This device may serve also as a storage means for goods e.g. in luggage-rooms, in drying kilns and the like. In smaller size the device may be used for steady or periodical circulation of individual platforms for purposes of exhibition or decoration, e.g. in show-windows, or as a toy. A particularly advantageous possibility of use of the device according to the invention consists in providing it over or under the ground as an automobile garage. One or more entrances and exits for the automotive vehicles to be stored may be provided at any point along the device. Over a loading ramp conveniently provided at the entrance and exit, the car to be stored can be driven onto the respective platform. The device according to the invention is particularly suited for a garage under a building in the city areas.

In order to have a separation between the individual platforms, it is also advantageous to have every platform having at its end towards the subsequent platform a partition normal thereto.

In the accompanying drawings there is illustrated, diagrammatically, a device of the kind according to the invention, in two embodiments given by way of example for a horizontally arranged garage.

Figs. 1a and 1b show a side view of a first embodiment of the invention.

Figs. 2a and 2b represent a plan view of the same embodiment of the invention.

Fig. 3 shows a side view of a second embodiment of the invention.

Fig. 4 represents a plan view of the same embodiment of the invention.

Figures 1A, 2A:
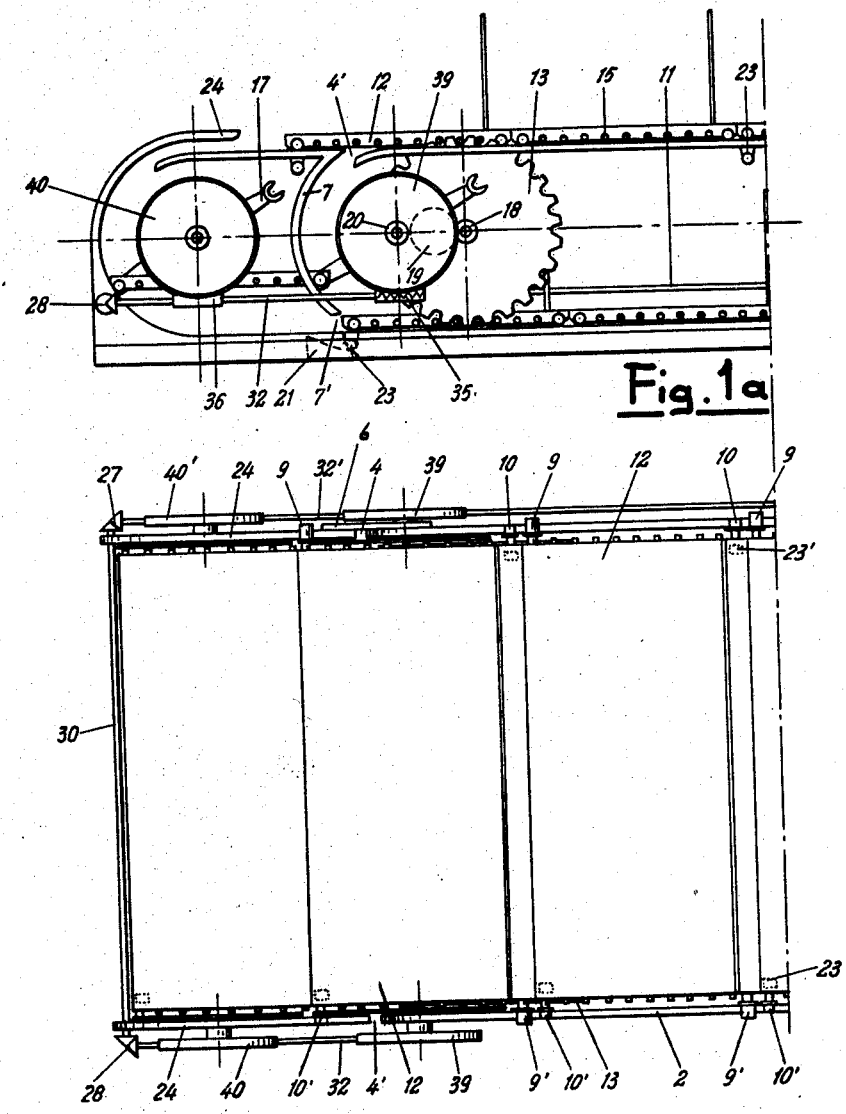

The conveyor comprises in the lower rail track 1 and the upper rail track 2, which overlap each other at both sides of the device in the shape of a semi-circle. The upper rails 2 are interrupted at the places 3 and 4 as well as 3' and 4' in such a way that the width of the interruption corresponds to the diameter of the platform rolls or studs. The interruptions 3 and 4, which are diagonal in respect to each other, are bridged at their sides by auxiliary (additional) rails 5 and 6. The internal retaining rails 7 and 8 provided at both sides are terminated at their lower ends 7' and 8' at a distance corresponding at least to the diameter of the platform rolls, before the lower rails 1.

Each individual platform with a bottom plate 12 has two pairs of rolls running on two axles, the rolls or studs 9 and 9' respectively diagonally opposite having a width corresponding to the sum of the widths of the rails and of the auxiliary rails, while on the contrary the respective other two diagonally arranged platform rolls or studs 10 and 10' have only a width corresponding to the rail width. At each side face of the platforms facing the running rails 1 and 2, there are arranged, between the running axles thereof, at regular distances, pins 15 having a diameter corresponding to the axle diameter of the rolls, with which two drive gears 13 and 14 engage in both running planes; of said wheels the one located in front in the running direction of the platforms of the upper floor e.g. wheel 13, acts as a driving wheel while the rear one 14 acts only as a braking wheel and thus prevents free running of the platforms when the conveyor is stopped. In the transition zones of the two floors there are provided in each zone two reversing gear pairs 37–40 and 37'–40' arranged at the centres of the arc-of-circle-shaped external and retaining rail tracks, which gear pairs are coupled with the drive gears 13 and 14 through the respective intermediate gears 18, 19 and 20 in such a manner, that one half duration of revolution of the reversing gears corresponds to the time of the advancement of the platforms by one platform unit, as caused by the drive gears.

Each reversing gear, has, moreover, two lever arms 16 and 17 arranged diametrally opposite and engaging with the respective rolls of the platforms arriving at the beginning of the transition zone, taking them along and pressing them against the external rails 24 and the retaining rails co-ordinated therewith and permitting thus the platforms to traverse from one floor to the other while keeping up their horizontal position. In this passage from one floor to the other one, the wide front roll 9 (or 9' according to which is the circulating direction) of the respective platform runs over the auxiliary rail 6 (or 5) and is lifted off its running rail by a lever arm of the gear 40' (or 37). At the same time, also the two rear rolls of the platform arriving itself in the reversing zone are gripped by the reversing gears 39 and 39' (or 38 and 38') with the lever arm thereof and are led along the retaining rails through the apertures 4 and 4' (or 3 and 3'). The diagonal arrangement of the respective wider and narrower running rolls permits the circulation of the platforms in both directions. In order to facilitate rising of the platforms at the reversing spots, there are provided arc-of-circle-shaped rail sections 21 and 22 below the arc-of-circle-shaped retaining rails and below the auxiliary rails 6 and 5 respectively; upon rail sections 21 and 22 bear guide rolls 23 which are arranged diagonally and below each narrow roll 10, 10' of individual platform corresponding in width only to rail width, so that the platform receives additional support.

The reversing gears are interconnected through worm gears 33—36 with shafts 31, 32, 31', 32' belonging thereto and bevel gears 25—28 provided at the corners of the plant with corresponding connecting shafts 29 and 30 and they may be driven in common by the main shaft 11 e.g. by means of a motor.

The embodiment of the invention hereinbefore described is susceptible of many modifications such as for instance the use of simple arms in the device for transferring the platforms from one track to the other; the formation of the track by means of three rails instead of two pairs of rails with mechanical transferring means formed by at least one pair of arms or coaxial wheels and by at least one arm or wheel out of axis in such a way as to engage contemporaneously every platform at three distinct points. The use of single rail guides, Figures 3 and 4 relate to these modifications.

In the embodiment represented in these figures, each of the platforms 41 is provided with two pairs of running rolls 42, 42' and 43, 43' aligned with each other and having the same track gauge as the track formed by the rails 44 and 44' of the upper track and by the lower one 45. Each of the rails of the upper track is connected with the corresponding lower one through the arcuate guides 46, 46' and 47, 47', the curvature centres 48, 48, and 49, 49' whereof are spaced from each other by a length equal to the interaxial distance of the running rolls 42, 43 and 42', 43' of the platforms.

The crossings 50, 51 and 52, 53 defined by the upper track and by the lower one with the internal arcuate guides 46' and 47' are provided with oscillating switch blades 54, 55, 56, 57. Said oscillating switch blades have profiled projections by means of which, in co-operation with the rolls 42 and 43, there are pre-arranged the passages of said rolls within the corresponding arcuate guides to keep parallelism of the platforms in passing from one track to the other, by means of the rotating arms 60, 61 and 62, 63.

The mechanical means for advancing the platforms along the upper and lower tracks are constituted by toothed pinions 64, 65 and 66, 67 meshing with the small rolls 68 directly fixed to the flanks of the platforms.

Advancement pinions and transferring arms are kinematically connected with each other by way of pairs of gears 69 and 70 and the whole device is moved in synchronism by means of transmissions by the electric motor 71.

Having thus described our invention, we claim and desire to protect by Letters Patent:

1. A conveyor system comprising a pair of upper and a pair of lower spaced horizontal rails, a plurality of disconnected abutting platforms on said rails, means for driving said platforms along said track rails, each platform having a pair of long and a pair of short laterally projecting front and rear studs adapted to support it on said track rails, the long studs being of a length to extend beyond the outer faces of said track rails and arranged at diagonal corners of each platform, the short studs being of a length to extend no farther than the outer faces of said track rails and arranged at the other diagonal corners of each platform, pairs of arcuate guide means at each end of said track rails spaced by a distance corresponding to the spacing of said studs, said upper rails being interrupted adjacent their outer ends to provide spaces slightly greater than the diameter of a stud, said upper track rails having a pair of laterally, outwardly offset portions spanning a pair of diagonally opposite spaces corresponding to the diagonal arrangement of said long studs, the upper ends of the innermost of said guide means being adjacent the upper rails at the outer ends of said spaces, the lower ends of said innermost guide means being spaced above said lower track a distance slightly greater than the diameter of a stud, the upper ends of the outermost of said guide means overlapping the outer ends of said upper track rails and spaced therefrom by a distance slightly greater than the diameter of a stud, the lower ends of said outer guide means being adjacent the lower track rails, whereby said long studs will ride over said offset rail portions and said short studs will pass through said offset rail portions, gripper means on each end of said track rails adapted to engage the studs of each platform for transferring said platform from one track to the other, and reversible power means for operating said drive means and said gripper means to complete the track-to-track transfer in the time required for the platforms on the track to advance by the length of a platform.

2. The conveyor system as set forth in claim 1, said gripper means at each end of said track rails comprising spaced wheels at the centers of said arcuate guide means at each end of said track rails, gripper arms extending diametrically across and beyond the circumference of said wheels, and having free bifurcated ends to grip the studs of each platform, the opposite ends of the arms being connected by a connecting rod.

3. A conveyor system as set forth in claim 1, said lower rails having rail sections with arcuate upper edges secured on the inner faces of said lower rails below the lower ends of the innermost arcuate guide means and below the diagonally arranged offset portions of the upper rails, said platforms each having rolls depending from diagonal corners corresponding to the diagonal arrangement of said lower rail sections, to assist the transfer of the trailing edge of each platform from the lower rail to the innermost arcuate guide means and vice versa.

References Cited in the file of this patent

UNITED STATES PATENTS

| 2,186,854 | Auger et al. | Jan. 9, 1940 |
| 2,334,511 | Seubert | Nov. 16, 1943 |
| 2,555,838 | Abbott | June 5, 1951 |

FOREIGN PATENTS

| 452,951 | Germany | Nov. 25, 1927 |
| 576,381 | Great Britain | Apr. 1, 1946 |
| 719,154 | Germany | Mar. 30, 1942 |